J. Birkenhead.
Spinning Ring.
No. 3,557. Reissued Jul. 20, 1869.
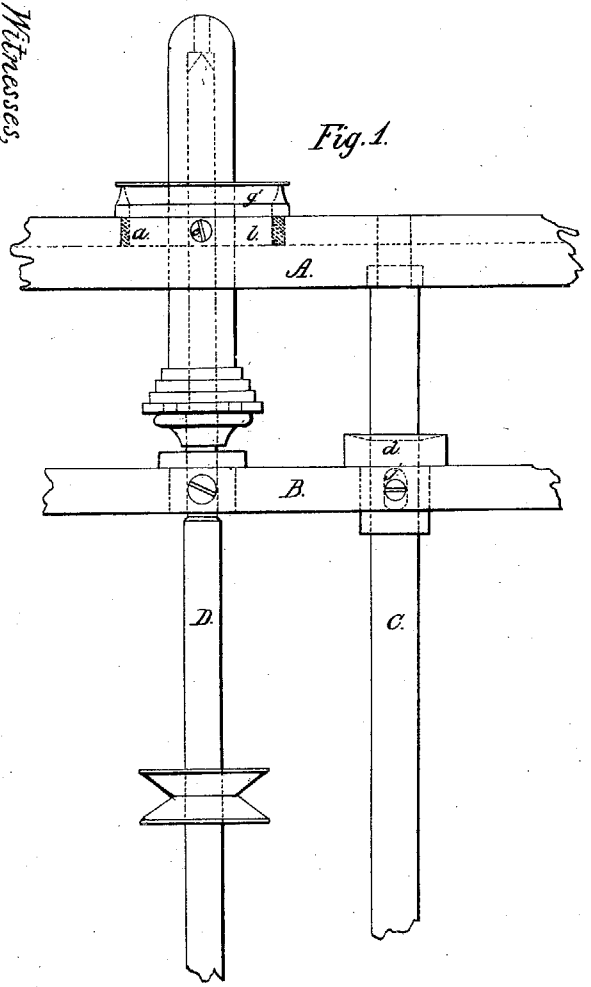
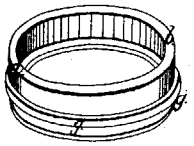
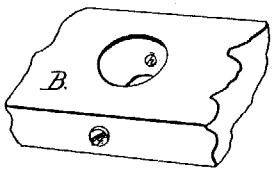
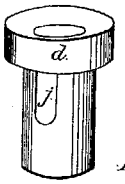
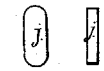
Witnesses,
Wm. Dent
Robt. Dent
Inventor.
John Birkenhead.
PETERS, PHOTO-LITHOGRAPHER, WASHINGTON, D. C.

United States Patent Office.

JOHN BIRKENHEAD, OF ILION, NEW YORK.

*Letters Patent No.* 42,829, *dated May* 24, 1864; *reissue No.* 3,557, *dated July* 20, 1869.

IMPROVEMENT IN RING FOR SPINNING.

The Schedule referred to in these Letters Patent and making part of the same.

*To all whom it may concern:*

Be it known that I, JOHN BIRKENHEAD, of Ilion, in the county of Herkimer, and State of New York, have invented Improved Means of Adjusting the Rings and Ring-Rails in Spinning-Frames; and I do hereby declare that the following is a full and exact description thereof, reference being had to the accompanying drawings, making part of this specification—

Figure 1 being a view of so much of a spinning-frame as is necessary to represent my improvements, and the same applied thereto.

Figure 2, a view, in perspective, of one of the improved rings, inverted, in position.

Figure 3, a view, in perspective, of a portion of the bolster-rail, to which another feature of my invention is applied.

Figure 4, a view, in perspective, of my improved lifter-rod bush.

Figures 5 and 6, side and edge views, respectively, of the gib which I employ in connection with the said bush.

Like letters designate corresponding parts in all of the figures.

In constructing ring-rails for spinning-frames, great difficulty is found in getting the holes for the reception of the rings precisely concentric with the spindles which are to revolve within them. When the hole is not thus concentric with the spindle, the ring being concentric with the hole, the traveller is thereby made to bear hardest upon one side of the ring, causing the ring to wear unevenly, and especially giving the traveller a vibratory motion and an uneven tension thereon, the effect of which is to make the yarn uneven, frequently to such an extent as to render it useless.

The traveller is caused to traverse around the ring by the tension of the yarn; and since its speed is very great, reaching as high as from six to seven, or more, thousand revolutions a minute, the slightest eccentricity of the ring is injurious.

The ring-holes may be originally eccentric, may become so by some disturbing cause in the operation of the machine, either in the disarrangement of the ring or of the spindle, by wear or other cause.

To secure the required concentricity of the rings and spindles, in all cases, by the employment of rings with eccentric bearings, to fit the ring-holes of the frame.

Thus, in the drawings, let A represent the ring-rail; B, the bolster-rail; C, the lifter-rod or pin; and D, one of the spindles.

The rings *g g* are turned as usual, except their bearing-flanges, which enter the holes of the rail. These flanges are turned somewhat eccentric from the main part of the rings, as indicated at *a b*, fig. 2.

The degree of eccentricity may be only sufficient to compensate for any ordinary degree of eccentricity which may be found in the ring-holes of a spinning-frame, and different rings may have different degrees of eccentricity.

The rings are placed in the holes of the rails, and if the latter are eccentric, the bearings of the rings are turned round therein until the eccentricity of the one exactly compensates for that of the other, so that the rings themselves are concentric with the spindles.

The rings are then secured in position by set-screws *c c* in the rail, made to press against the ring-bearings.

Another difficulty experienced in spinning-frames is caused by the wearing of the lifter-rod or pin C, in its bush in the bolster-rail B, the wear generally being on that side of the rod which is toward the front of the machine, and causing the ring-rail to lean forward, thereby making the rings eccentric in relation to their spindles, with the evil effects above mentioned.

The object here is to compensate for the wear, which readjustment I accomplish by means of a gib, *j*, situated in a slot or aperture in one side of the bush *d*, and bearing against the lifter-rod, in connection with adjusting-screws *f h*, in the bolster-rail.

The bush *d* may be of ordinary construction, except a suitable slot or aperture in one side, to receive the gib *j*, and retain it in position.

When it is placed in its hole in the rail, one set-screw, *f*, bears against the gib, and the other, *h*, against the opposite side of the bush.

If the lifter-rod C begins to wear loose in the bush, so as to get out of proper position, the set-screws are adjusted so as to tighten up the rod again, and bring it into the required position to readjust the ring-rail.

Thus, with the combined use of the gib, bushes, and rings with eccentric bearings, the ring-rail can always be properly adjusted, as well as the individual rings therein.

What I claim as my invention, and desire to secure by Letters Patent, is—

A spinning-ring, having an eccentric bearing, substantially as and for the purpose set forth.

Also, the combination of the gib *j* and bush *d*, substantially as and for the purpose herein set forth.

JOHN BIRKENHEAD.

Witnesses:

GEORGE D. NOYES,

JAMES W. BROOKS.